United States Patent
Lei et al.

(10) Patent No.: US 10,142,420 B2
(45) Date of Patent: Nov. 27, 2018

(54) ON-BOARD WEB SERVER TELEMATICS SYSTEMS AND METHODS

(71) Applicant: FORD GLOBAL TECHNOLOGIES, LLC, Dearborn, MI (US)

(72) Inventors: Oliver Lei, Windsor (CA); Allen R. Murray, Lake Orion, MI (US); James Dragescu, San Diego, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 14/835,389

(22) Filed: Aug. 25, 2015

(65) Prior Publication Data

US 2017/0063994 A1 Mar. 2, 2017

(51) Int. Cl.

| H04L 29/08 | (2006.01) |
|---|---|
| B60L 11/18 | (2006.01) |
| G06F 3/0482 | (2013.01) |
| G06F 3/0484 | (2013.01) |
| H04L 29/12 | (2006.01) |
| H04W 4/12 | (2009.01) |
| H04W 12/06 | (2009.01) |

(52) U.S. Cl.
CPC .......... *H04L 67/12* (2013.01); *B60L 11/1861* (2013.01); *G06F 3/0482* (2013.01); *G06F 3/04842* (2013.01); *H04L 61/10* (2013.01); *H04W 4/12* (2013.01); *H04W 12/06* (2013.01)

(58) Field of Classification Search
CPC ......... H04W 4/00; H04W 4/12; H04W 12/06; G06F 17/30; G06F 3/0482; G06F 3/04842; H04L 67/12; H04L 61/10; B60L 11/1861
See application file for complete search history.

(56) References Cited

U.S. PATENT DOCUMENTS

| 6,429,773 | B1 * | 8/2002 | Schuyler | B60R 25/04 340/425.5 |
|---|---|---|---|---|
| 7,039,708 | B1 * | 5/2006 | Knobl | B60R 25/04 709/203 |
| 8,897,952 | B1 * | 11/2014 | Palmer | G07C 5/008 701/29.1 |
| 9,591,482 | B1 * | 3/2017 | Finnerty | H04W 12/06 |
| 2002/0075843 | A1 * | 6/2002 | Lau | H04L 29/06 370/349 |
| 2003/0076792 | A1 * | 4/2003 | Theimer | G06F 21/33 370/328 |
| 2004/0082318 | A1 * | 4/2004 | Lane | G08G 1/133 455/414.1 |
| 2004/0185842 | A1 * | 9/2004 | Spaur | B60R 25/04 455/420 |
| 2005/0184858 | A1 * | 8/2005 | Griffin | B60R 25/04 340/426.11 |
| 2006/0238320 | A1 * | 10/2006 | Veliu | G08G 1/0962 340/438 |

(Continued)

Primary Examiner — Courtney D Heinle
(74) Attorney, Agent, or Firm — Jennifer M. Stec; Brooks Kushman P.C.

(57) ABSTRACT

A web server may be installed to a telematics control unit of a vehicle. The telematics control unit and a plurality of vehicle controllers may be connected to a vehicle bus. The web server may be programmed to host a plurality of web applications configured to expose telematics functions of the vehicle controllers to a mobile device connected to the web server, and authenticate the mobile device to access to the web applications.

5 Claims, 11 Drawing Sheets

(56) References Cited

U.S. PATENT DOCUMENTS

| | | | |
|---|---|---|---|
| 2007/0121641 A1* | 5/2007 | Hovey | H04L 67/14 370/395.2 |
| 2007/0219685 A1* | 9/2007 | Plante | G06F 9/4443 701/33.4 |
| 2007/0252689 A1* | 11/2007 | Rothschild | G08G 1/005 340/539.13 |
| 2009/0167524 A1* | 7/2009 | Chesnutt | G08C 17/02 340/539.19 |
| 2009/0233572 A1* | 9/2009 | Basir | H04M 3/5116 455/404.1 |
| 2009/0325596 A1* | 12/2009 | Oesterling | H04W 4/20 455/456.1 |
| 2010/0073125 A1* | 3/2010 | Alrabady | H04L 9/3247 340/5.2 |
| 2013/0090782 A1* | 4/2013 | Yi | H04L 69/22 701/2 |
| 2013/0282254 A1* | 10/2013 | Dwan | G07C 5/008 701/101 |
| 2014/0096217 A1* | 4/2014 | Lehmann | H04L 63/08 726/7 |
| 2014/0109075 A1* | 4/2014 | Hoffman | G06F 8/65 717/169 |
| 2015/0215274 A1* | 7/2015 | Imadali | H04L 61/6059 709/245 |
| 2016/0232721 A1* | 8/2016 | Singh | G07C 5/0825 |
| 2017/0021760 A1* | 1/2017 | Calnek | H04W 4/02 |
| 2017/0063994 A1* | 3/2017 | Lei | H04L 67/12 |

\* cited by examiner

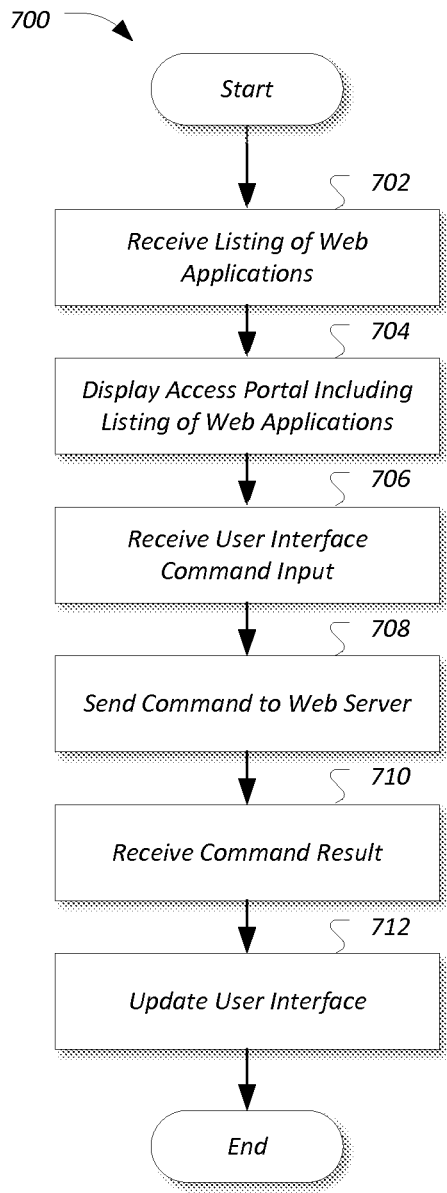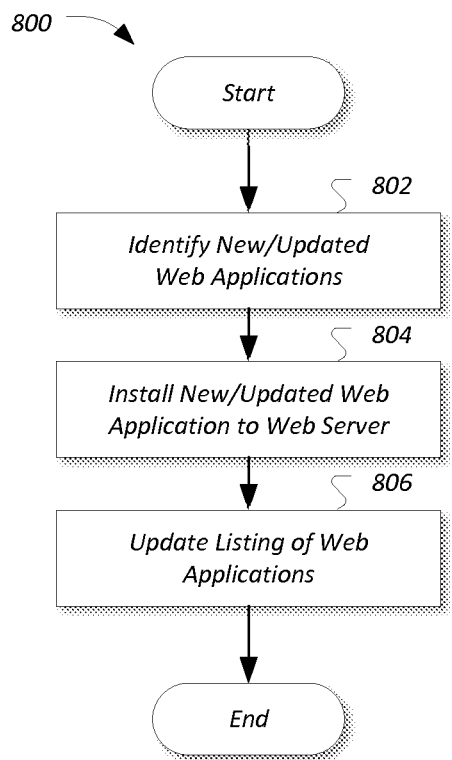
FIG. 7
FIG. 8

ON-BOARD WEB SERVER TELEMATICS SYSTEMS AND METHODS

TECHNICAL FIELD

Aspects of the disclosure generally relate to a telematics scheme having an in-vehicle web server.

BACKGROUND

Remote vehicle service requests, such as door lock and unlock, may be passed through a backend telematics server. The backend telematics server receives the service request, and issues a control command to the telematics control unit of the vehicle. The command may be issued over a cellular communication channel to the telematics control unit of the vehicle. The backend telematics server may be operated by the automobile manufacturer, and may be associated with ongoing operational and maintenance costs to the manufacturer.

Once the vehicle is sold to a customer, it may be difficult to add new features to the telematics control unit of the vehicle. Even though new features may be implemented through a software update applied over the air to the telematics control unit, the development and testing costs to add the new features to the backend telematics server may be significant, as the changes may affect a large number of vehicles in the field.

SUMMARY

In a first illustrative embodiment, a system includes a mobile device programmed to query an address resolution server for a vehicle address of a web server associated with an identifier of the vehicle; initiate a web connection to the vehicle address; display an access portal including a listing of telematics web applications installed to the web server; and access one of the telematics web applications via the web connection to request the vehicle to perform a telematics command.

In a second illustrative embodiment, a method includes maintaining identifiers of vehicles and associated telephone numbers and network addresses; receiving a request for a network address of a web server associated with a vehicle identifier; sending a wake-up message to a telephone number associated with the vehicle identifier; receiving a wake-up response including a network address of the web server; and returning the network address responsive to the request.

In a third illustrative embodiment, a system includes a vehicle modem; a plurality of vehicle controllers connected to a vehicle bus; and a web server installed to a telematics control unit connected to the vehicle bus, the web server programmed to host a plurality of web applications configured to expose telematics functions of the vehicle controllers to a mobile device connected to the vehicle modem, and authenticate the mobile device to access to the web applications.

BRIEF DESCRIPTION OF THE DRAWINGS

FIG. 7 illustrates an example process for displaying an access portal of the web server of the vehicle by the mobile device; and FIG. 8 illustrates an example process for adding web applications to the web server.

DETAILED DESCRIPTION

Figure 1:
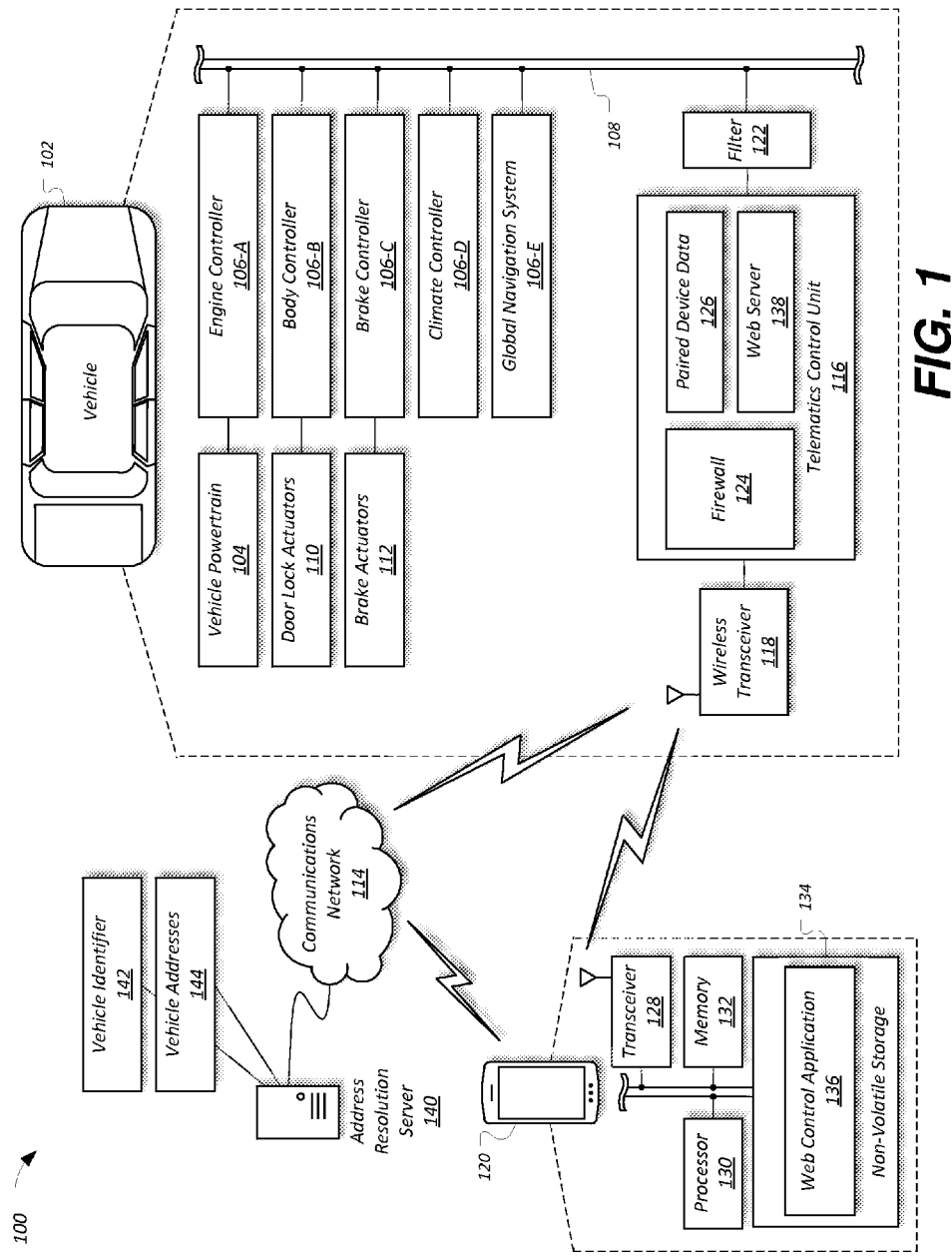
FIG. 1 illustrates an example system including a vehicle having an on-board web server controllable by a remote service application of a mobile device.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A telematics scheme may be implemented without use of a backend telematics server. Instead, a telematics control unit (sometimes referred to as a TCU) of a vehicle may utilize an on-board web server to control telematics functions according to network traffic directed to the vehicle. The onboard web server may monitor incoming network traffic for network connections from mobile devices. In an example, the network connection may be a cellular connection over a cellular communications network. In another example, the network connection may be a local connection between the mobile device and the vehicle, such as over a Wi-Fi network. When a connection is received, the vehicle firewall may validate the mobile device (e.g., via IP address, MAC address, paired device data, etc.) to ensure that the mobile device has permission to access the web server. If the connection is validated, the web server may perform further authentication of the mobile device or the user of the mobile device. In an example, the web server of the vehicle may request a certificate from the mobile device, and the mobile application may send a certificate of the mobile device to the web server for verification. Additionally or alternately, a username, password, or gesture, fingerprint, or other verification may be utilized for authentication.

A user may utilize a mobile application installed to the user's mobile device to display an access portal hosted by the web server. In an example, the mobile application may be a web browser application. In another example, the mobile application may be an application specially-configured to interact with on-board vehicle web servers. In yet another example, the web server may initiate a network connection to the mobile device. The access portal may allow the user to select telematics functions to be performed or to execute applications installed to the web server. In an example, the user may use the portal to select a key fob application, and from the key fob application request that a "door unlock" command be performed by the vehicle. To perform a telematics function, a remote service request may be sent from the user's mobile device over the network connection to the web server of the telematics control unit.

When the command is received by the web server, and authentication of the mobile device is successful, the web server may send the command to the vehicle systems to perform the requested function. In an example, the telematics control unit may be connected to a vehicle bus, and the web server may cause the telematics control unit to send a message over the vehicle bus to a controller to perform the requested action. Continuing with the key fob example, the telematics control unit may send a "door unlock" command to the vehicle body controller to perform the requested action (e.g., a door unlock action). Responsive to sending the command, the telematics control unit may receive a command result from the body controller. The command result may include information, such as whether the command was successful, and/or a new status of the body controller responsive to the command (e.g., that one or more doors are unlocked). The web server may send the command results to the mobile device responsive to the "door unlock" command request.

To save battery charge or to meet key-off load requirements, the vehicle may discontinue operation of the web server during certain conditions, such as when the vehicle is off. In some cases, the user may desire to send a command request when the web server is in a deactivated state. To re-active the web server, a wake-up message may be sent to the telematics control unit of the vehicle. In an example, the mobile device may attempt to form a network connection to the on-board web server of the vehicle, and if the web server does not respond within a predetermined timeout period, the mobile device may send the wake-up message to the vehicle. In another example, the mobile device may request the address of the web server from an address resolution server, and if no address is on file, the address resolution server may send the wake-up message to the vehicle. The wake-up message may be a short message service (SMS) message or other message sent to an in-vehicle modem over a connection other than the inactive connection used by the web server. Responsive to receipt of the wake-up message, the telematics control unit may wake up the on-board web server. The telematics control unit may further send a return message in response to the wake-up message, e.g., when the web server is re-activated and available for use. Upon receipt of the return message, the web server may be reactivated and available for use by the mobile device.

By using a web server on-board the vehicle, the operational and maintenance costs of managing a backend telematics server may be avoided. The telematics control unit software may be updated, e.g., via a downloaded update adding new features, without affecting the functionality of other vehicles in the field. Moreover, third parties may be able to utilize the services of the on-board web server to install custom applications to the telematics control unit to provide diagnostic data to the customer. For instance, the user may browse and install applications to the vehicle on-board web server similar to installation of applications to the mobile device.

FIG. 1 illustrates an example system 100 including a vehicle 102 having an on-board web server 138 controllable by a web control application 136 of a mobile device 120. As illustrated, the vehicle 102 includes a vehicle powertrain 104 connected to one or more vehicle wheels to propel the vehicle, and a plurality of vehicle ECUs 106 in communication over one or more vehicle buses 108 to control the vehicle powertrain 104 and other vehicle 102 functions, such as a vehicle door lock actuators 110 or brake actuators 112. The vehicle 102 also includes a telematics control unit 116 having a firewall 124 and configured to communicate with paired mobile devices 120 via a wireless transceiver 118. The telematics control unit 116 may also be connected to the vehicle bus 108 through a filter 122. The system 100 also includes a mobile device 120 having a web control application 136 and in communication with an address resolution server 140 over a communications network 114. The address resolution server 140 may receive vehicle identifiers 142 from the mobile device 120, and provide vehicle address 144 information to the mobile device 120, thereby allowing the web control application 136 to communicate with the network address of the telematics control unit 116. While an example system 100 is shown in FIG. 1, the example components illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people and/or goods. The vehicle powertrain 104 may include one or more engines or motors configured to supply the motive force to propel the vehicle 102. In an example, the vehicle 102 may be powered by an internal-combustion engine coupled to the drive wheels via a transmission to a differential. In another example, the vehicle 102 may be a hybrid electric vehicle (HEV) powered by both an internal combustion engine and one or more electric motors, such as a series hybrid electric vehicle (SHEV), a parallel hybrid electrical vehicle (PHEV), a parallel/series hybrid electric vehicle (PSHEV), or a compressed natural gas (CNG) engine vehicle. As the type and configuration of vehicle 102 may vary, the capabilities of the vehicle 102 may correspondingly vary. As some other possibilities, vehicle 102 may have different capabilities with respect to cargo capacity, passenger capacity, and towing ability.

The vehicle 102 may include a plurality of electronic control units (ECUs) 106 configured to perform and manage various vehicle 102 functions under the power of the vehicle battery and/or drivetrain. As depicted, the example vehicle ECUs 106 are represented as discrete ECUs 106-A through 106-F. However, the vehicle ECUs 106 may share physical hardware, firmware, and/or software, such that the functionality from multiple ECUs 106 may be integrated into a single ECU 106, and that the functionality of various such ECUs 106 may be distributed across a plurality of ECUs 106. The vehicle ECUs 106 may include various vehicle 102 components configured to receive updates of associated software, firmware, or configuration settings.

As some examples, an engine controller ECU 106-A may be configured to provide for monitoring and control of the vehicle powertrain 104. A body controller ECU 106-B may manage various power control functions such as exterior lighting, interior lighting, keyless entry, door lock actuators 110 to lock and unlock vehicle doors, remote start, and point of access status verification. A brake controller 106-C may be configured to communicate brake actuators 112 or other vehicle 102 safety systems. A climate controller ECU 106-E may be configured to provide control of heating and cooling system components (e.g., compressor clutch, blower fan, temperature sensors, etc.) to manage climate in cargo and/or passenger compartments. A global navigation satellite system (GNSS) controller ECU 106-F may be configured to provide vehicle location information using a system such as the U.S. global positioning system (GPS), the European Galileo system, the Russian GLONASS system or the Chinese Compass/Beidou system.

The vehicle bus 108 may include various methods of communication available between the vehicle ECUs 106. As some non-limiting examples, the vehicle bus 108 may include one or more of a vehicle controller area network (CAN), an Ethernet network, and a media oriented system transfer (MOST) network.

The telematics control unit 116 may be configured to provide telematics services to the vehicle 102. These services may include, as some non-limiting possibilities, navigation, turn-by-turn directions, vehicle health reports, local business search, accident reporting, and hands-free calling. To support these and other telematics services, the telematics control unit 116 may utilize network hardware configured to facilitate communication between the vehicle ECUs 106 and with other devices of the system 100. The telematics control unit 116 may also include computing hardware in support of the performance of the functions of the telematics control unit 116 discussed herein. This computing hardware may include, as some possibilities, one or more processors configured to execute instructions loaded to a memory from a storage medium.

In an example, telematics control unit 116 may utilize the modem services of a wireless transceiver 118 for communication over the communications network 114. In another example, the wireless transceiver 118 may be configured to communicate over one or more of Bluetooth, Wi-Fi, and wired USB with a mobile device 120 of a user. The wireless transceiver 118 may include network hardware configured to facilitate communication over the communications network 114 between the vehicle 102 and other devices of the system 100. The communications network 114 may include one or more interconnected communication networks such as the Internet, a satellite link network, a local area network, a wide area network, a wireless local area network (WLAN) including dedicated short range communication (DSRC), a cellular network, and a telephone network, as some non-limiting examples.

To ensure secure functional separation of the telematics control unit 116 from the vehicle bus 108 communications of the vehicle ECUs 106, the telematics control unit 116 may be configured to send remote commands to the vehicle bus 108 through a filter 122. The filter 122 may implement a command validator to prevent commands from being requested by the web control application 136 that could place the vehicle 102 in a state inappropriate for the performance of repair or diagnostic actions, such as filtering out requests commanding an electric vehicle 102 to switch out of Park, releasing a parking brake, commanding a park-pawl actuator, or other operations related to putting the vehicle 102 in a motive or potentially motive state.

The firewall 124 may implement address filtering to prevent commands from being requested by the web control application 136 of an illegitimate mobile device 120. The firewall 124 may accordingly implement validation functionality, such as mobile device 120 certificate verification, to ensure that connected mobile devices 120 are authorized to use the telematics control unit 116 functionality of the vehicle 102.

A mobile device 120 may undergo a process the first time the mobile device 120 is connected to the telematics control unit 116, in which the telematics control unit 116 scans for mobile devices 120, and the user manually confirms an identification of the mobile device 120 to be connected to the telematics control unit 116. This process may be referred to as pairing. The telematics control unit 116 may maintain paired device data 126 indicating device identifiers or other information regarding mobile devices 120 that have been previously paired with the telematics control unit 116. Accordingly, once the pairing process is performed, the telematics control unit 116 may utilize the paired device data 126 to automatically reconnect to the mobile device 120 when the mobile device 120 is identified via the wireless transceiver 118 as being in proximity of the telematics control unit 116.

The mobile devices 120 may be any of various types of portable computing devices, such as cellular phones, tablet computers, smart watches, laptop computers, portable music players, or other devices capable of communication over the communications network 114. In an example, the mobile devices 120 may communicate with the communication network 114 and with the wireless transceiver 118 of the vehicle 102 using a modem or transceiver 128. The mobile devices 120 may include one or more processors 130 configured to execute instructions of mobile applications loaded to a memory 132 of the mobile device 120 from storage medium 134 of the mobile device 120. The web control application 136 may be an example of a mobile application installed to the mobile device 120. The web control application 136 may be configured to receive input (e.g., user input to a user interface of the mobile device 120), and send commands to the vehicle 102 via the telematics control unit 116, as discussed in greater detail below.

The web server 138 may include various types of computing apparatus including a memory on which computer-executable instructions may be maintained, where the instructions may be executable by one or more processors of the computing device. The web server 138 may be configured to maintain an access portal accessible to mobile devices 120 over the communication network 114. In an example, the web server 138 may be configured to provide the access portal to devices connected to the web server 138 via the wireless transceiver 118. As another possibility, the web server 138 may execute a server application that may be accessed by a dedicated client application of a connecting mobile device 120. Accordingly, the access portal of the web server 138 may provide a user interface to the mobile devices 120 allowing the mobile devices 120 to request telematics commands.

The web server 138 may perform authentication of the mobile device 120 to ensure that the mobile devices 120 have permission to access the provided user interface. If the authentication is successful, the web server 138 may send the requested telematics commands (e.g., a "door unlock" command in an example) to the vehicle bus 108 for routing and processing. The web server 138 may also send command results to the mobile device 120 responsive to the command request.

The address resolution server 140 may include various types of computing apparatus, such as a computer workstation, a server, a desktop computer, a virtual server instance executed by a mainframe server, or some other computing system and/or device. Similar to the mobile device 120, the address resolution server 140 may generally include a memory 132 on which computer-executable instructions may be maintained, where the instructions may be executable by one or more processors 130 (only one of which is shown for clarity). Such instructions and other data may be stored using a variety of computer-readable media. A computer-readable medium (also referred to as a processor-readable medium or storage 134) includes any non-transitory (e.g., tangible) medium that participates in providing data (e.g., instructions) that may be read by a computer (e.g., by the processor 130 of the address resolution server 140 or mobile device 120). In general, processors 130 receive instructions, e.g., from the memory 132 via the computer-readable storage medium 134, etc., and execute these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Objective C, Fortran, Pascal, Visual Basic, Java Script, Perl, Python, PL/SQL, etc.

The vehicle identifiers 142 may include various types of unique identifiers that are associated with the vehicles 102. In an example, the vehicle identifiers 142 may be vehicle identification number (VIN) serial numbers that are assigned to vehicles 102 by vehicle manufacturers in accordance with ISO 3833. As some other examples, the vehicle identifiers 142 may include identifiers of user accounts associated with the vehicles 102, such as MYFORD MOBILE user account identifiers, e-mail addresses, device identifiers of authorized mobile devices 120 such as those included in the paired device data 126, or unique codes installed to the telematics control unit 116 or the wireless transceiver 118 of the vehicle 102.

The vehicle addresses 144 may include routable network addresses of vehicles 102 that are connected to the communications network 114. In an example, the network addresses may include Internet Protocol version 6 (IPv6) addresses or Internet Protocol version 4 (IPv4) addresses. The address resolution server 140 may be configured to maintain an association of the vehicle identifiers 142 with current vehicle addresses 144. The address resolution server 140 may also be configured to maintain an association of the vehicle identifiers 142 with phone numbers of the wireless transceivers 118 (or other addresses other than the vehicle addresses 144 by which the vehicles 102 may be reached over the communications network 114). In some cases, the web server 138 may not be connected to the communication network 114 and the current vehicle address 144 for the vehicle 102 may be an indication of the web server 138 being disconnected. Moreover, the vehicle addresses 144 may be dynamic, and may change for example when the web server 138 is reconnected to the communications network 114.

The mobile device 120 may access the address resolution server 140 to determine the vehicle address 144 of the vehicle 102. In an example, the web control application 136 may send to the address resolution server 140 a vehicle identifier 142 of the vehicle 102 for which a command is to be sent. The address resolution server 140 may look up the vehicle address 144 corresponding to the vehicle identifier 142, and may return the vehicle address 144 to the mobile device 120.

To save battery charge or to meet key-off load requirements, the web server 138 may discontinue operation during certain conditions, such as when the vehicle 102 is off. In some cases, the user of the mobile device 120 may desire to send a command request when the web server 138 is in a deactivated state. To re-active the web server 138, the mobile device 120 may send a wake-up message to the telematics control unit 116 of the vehicle 102. For instance, the mobile device 120 may attempt to form a network connection to the web server 138 of the vehicle 102, and if the web server 138 does not respond within a predetermined timeout period, the mobile device 120 may send the wake-up message to the vehicle 102. In an example, the wake-up message may be a short message service (SMS) message sent to a phone number or other identifier of the wireless transceiver 118 over a cellular connection (i.e., other than the vehicle address 144). Responsive to receipt of the wake-up message, the telematics control unit 116 may wake up the on-board web server 138. The telematics control unit 116 may further send a return message over SMS in response to the wake-up message, e.g., when the web server 138 is re-activated and available for use. Upon receipt of the return message, the mobile device 120 may again access the address resolution server 140 to determine the vehicle address 144 of the web server 138 of the vehicle 102.

By using the web server 138, the operational and maintenance costs of managing a backend telematics server may be avoided. For example, the telematics control unit 116 web server 138 software may be updated, e.g., via a downloaded update adding new features, without affecting the functionality of other vehicles 102 in the field. Moreover, third parties may be able to utilize the services of the on-board web server 138 to install custom applications to the telematics control unit 116 to provide diagnostic data to the customer. For instance, the user may browse and install applications to the web server 138 similar to installation of applications to the mobile device 120.

Figure 2A:
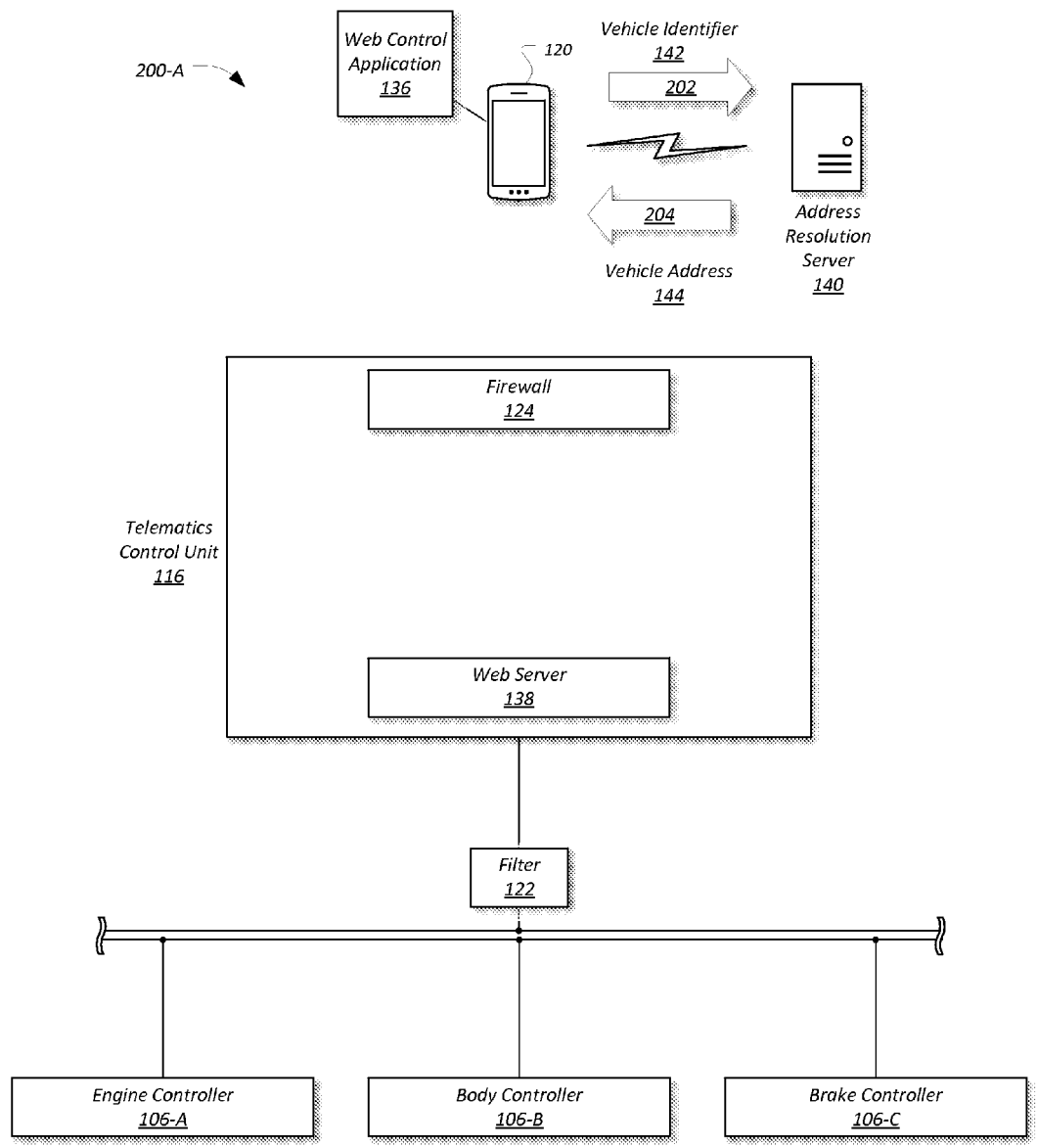
FIG. 2A illustrates an example data flow for requesting the vehicle address of the vehicle by the mobile device.

FIG. 2A illustrates an example data flow 200-A for requesting the vehicle address 144 of the vehicle 102 by the mobile device 120. The data flow 200-A may be initiated, in an example, responsive to a user initiating the web control application 136 for access to the web server 138 of the vehicle 102 to be commanded. As shown, the web control application 136 may direct the mobile device 120 to send a message over the communications network 114 to the address resolution server 140. The message 202 may include the vehicle identifier 142 of the vehicle 102 to be accessed. In response to receiving the message 202, the address resolution server 140 may access the stored vehicle addresses 144 to look up the vehicle address 144 associated with the vehicle identifier 142, and may send a response message 204 including the located vehicle address 144. The mobile device 120 may accordingly use the vehicle address 144 to contact the vehicle 102.

Figure 2B:
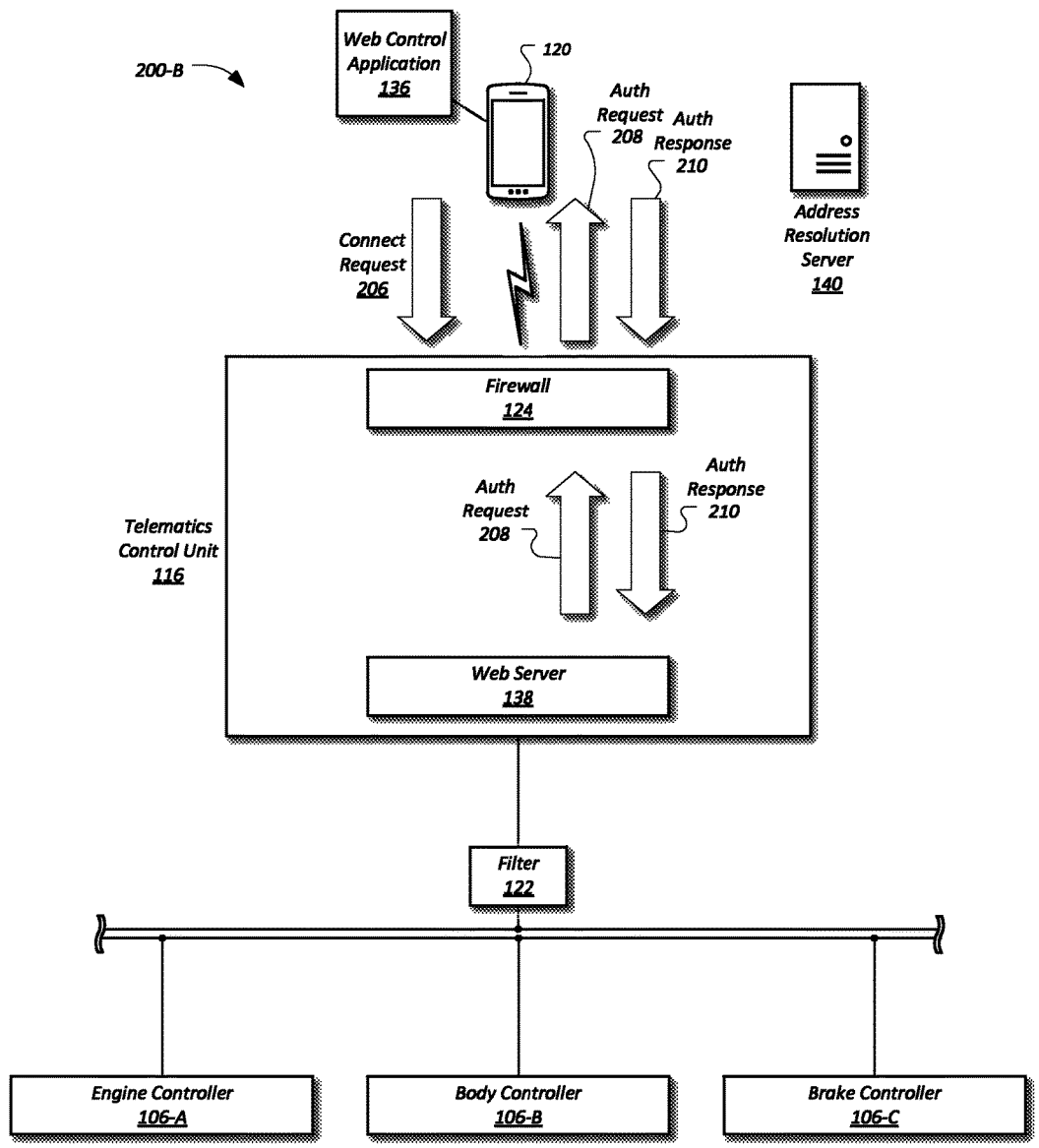
FIG. 2B illustrates an example data flow for authenticating the mobile device with the vehicle.

FIG. 2B illustrates an example data flow 200-B for authenticating the mobile device 120 with the vehicle 102. The data flow 200-B may be initiated, in an example, responsive to the web control application 136 receiving the vehicle address 144 from the address resolution server 140. As shown, the web control application 136 may direct the mobile device 120 to send a connection request 206 over the communications network 114 addressed to the vehicle address 144 of the vehicle 102.

The connection request 206 may include information identifying the mobile device 120. In an example, the connection request 206 may include a username and/or password of the user utilizing the mobile device 120. In another example, the connection request 206 may simply include a request to connect (e.g., via TCP/IP).

The connection request 206 may be received by the in-vehicle wireless transceiver 118, which may forward the message to the telematics control unit 116 for processing by the firewall 124. In response to receiving the connection request 206, the firewall 124 may validate the mobile device 120 (e.g., via IP address, MAC address, paired device data, etc.) to ensure that the mobile device has permission to access the web server 138. After the firewall validation, the web server 138 may send an authentication request 208 to the mobile device 120. The authentication request 208 may request credentials of the user of the mobile device 120 and/or credentials of the mobile device 120 itself. In an example, the authentication request 208 may request a certificate from the mobile device 120. The mobile device 120 may provide an authentication response 210 to the web server 138 in response to the authentication request 208. Continuing with the certificate example, the web control application 136 may direct the mobile device 120 to include the requested certificate in the authentication response 210. The web server 138 may accordingly validate the mobile device 120 using the received credentials (e.g., by comparing to stored credentials, verifying a received signature using a cryptographic key, etc.). If the web server 138 determines the credentials to be valid, the web server 138 may continue to communicate with mobile device 120.

It should be noted that the aforementioned authentication procedure is merely an example, and other authentication procedures may be used as well. For instance, the connection request 206 may include the authorization credentials, without requiring the authentication request 208. As another example, the firewall 124 may validate that the mobile device 120 against the paired device data 126, to ensure that the mobile device 120 has been previously paired with the vehicle 102 locally (e.g., using the wireless transceiver 118 to connect to the telematics control unit 116).

The web control application 136 may provide an access portal user interface from which the user may select commands to be sent from the mobile device 120 to the telematics control unit 116. In an example, the web control application 136 may receive data from the web server 138 of the telematics control unit 116 (e.g., hypertext provided via hypertext transfer protocol (HTTP) or secure hypertext transfer protocol (HTTPS), etc.), and render the data to the user interface of the mobile device 120 to display the access portal to the user. The web control application 136 may accordingly allow for the user to select commands to be performed from the displayed access portal, such as a request to lock or unlock vehicle 102 doors. In another example, the user interface may allow the user to select to honk the vehicle 102 horn. Further details of an example user interface are discussed below with respect to FIGS. 4A and 4B.

Figure 2C:
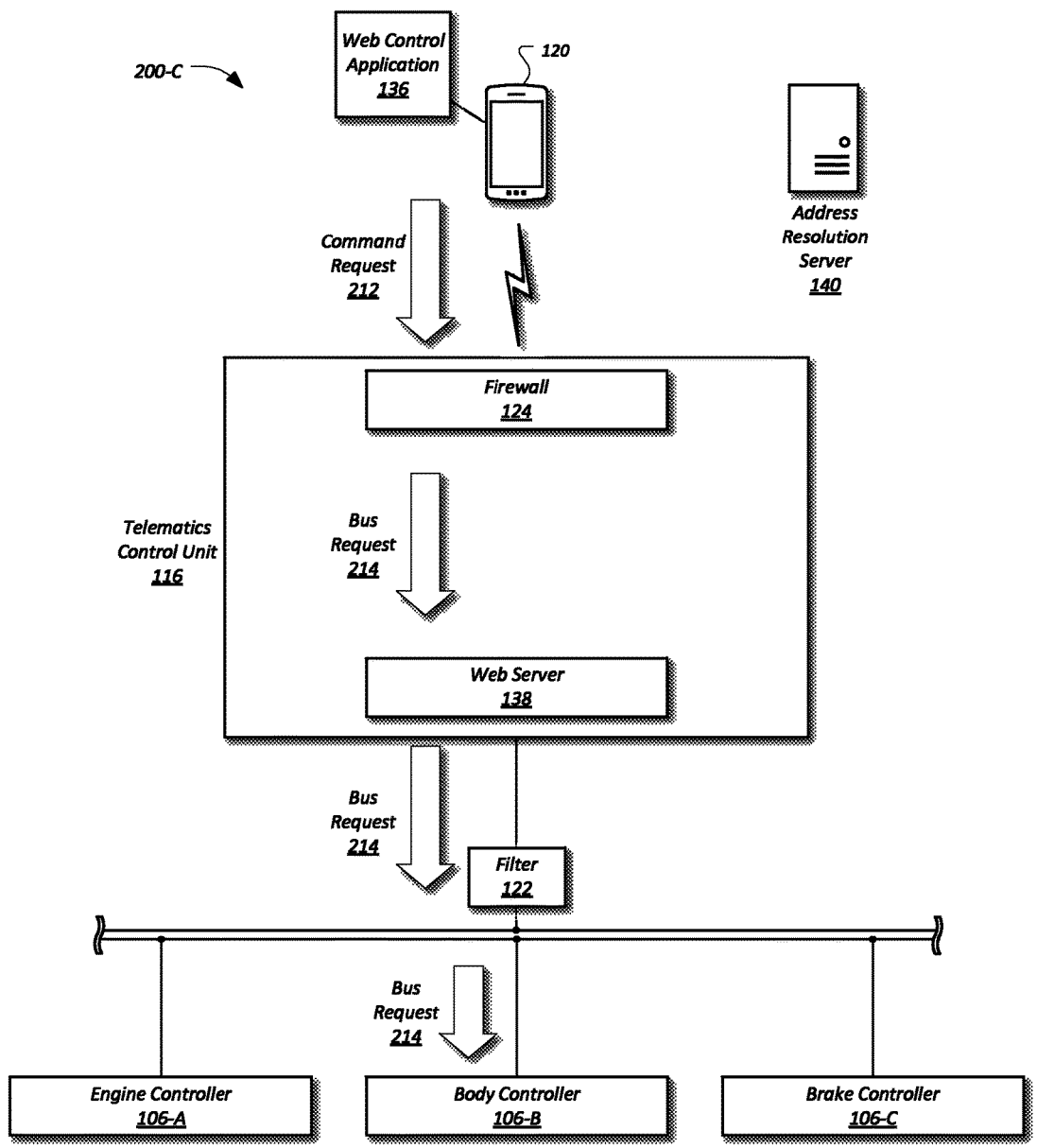
FIG. 2C illustrates an example data flow for sending a telematics command request to the vehicle from the mobile device.

FIG. 2C illustrates an example data flow 200-C for sending a telematics command requests 212 to the vehicle 102 from the mobile device 120. The data flow 200-C may be initiated, in an example, responsive to the web control application 136 receiving user input to an access portal displayed in the user interface of the mobile device 120. As shown, the web control application 136 may direct the mobile device 120 to send the command request 212 over the communications network 114 addressed to the vehicle address 144 of the vehicle 102.

The web control application 136 may send the selected command request 212 to the web server 138 of the telematics control unit 116 for processing. For instance, the command may be sent by the mobile device 120 over the communication network 114 to the wireless transceiver 118.

The wireless transceiver 118 may send the command request 212 to the telematics control unit 116. As the mobile device 120 has been validated by the firewall 124 (e.g., as discussed above with respect to FIG. 2B), the firewall 124 may forward the message to the web server 138 of the telematics control unit 116. The web server 138 may accordingly generate a bus command 214 configured to request the selected action of the appropriate vehicle ECU 106. In the illustrated example, the web control application 136 sends the bus command 214 via the filter 122 to the body controller 106-B (e.g., to unlock the doors), although other examples are possible.

Figure 2D:
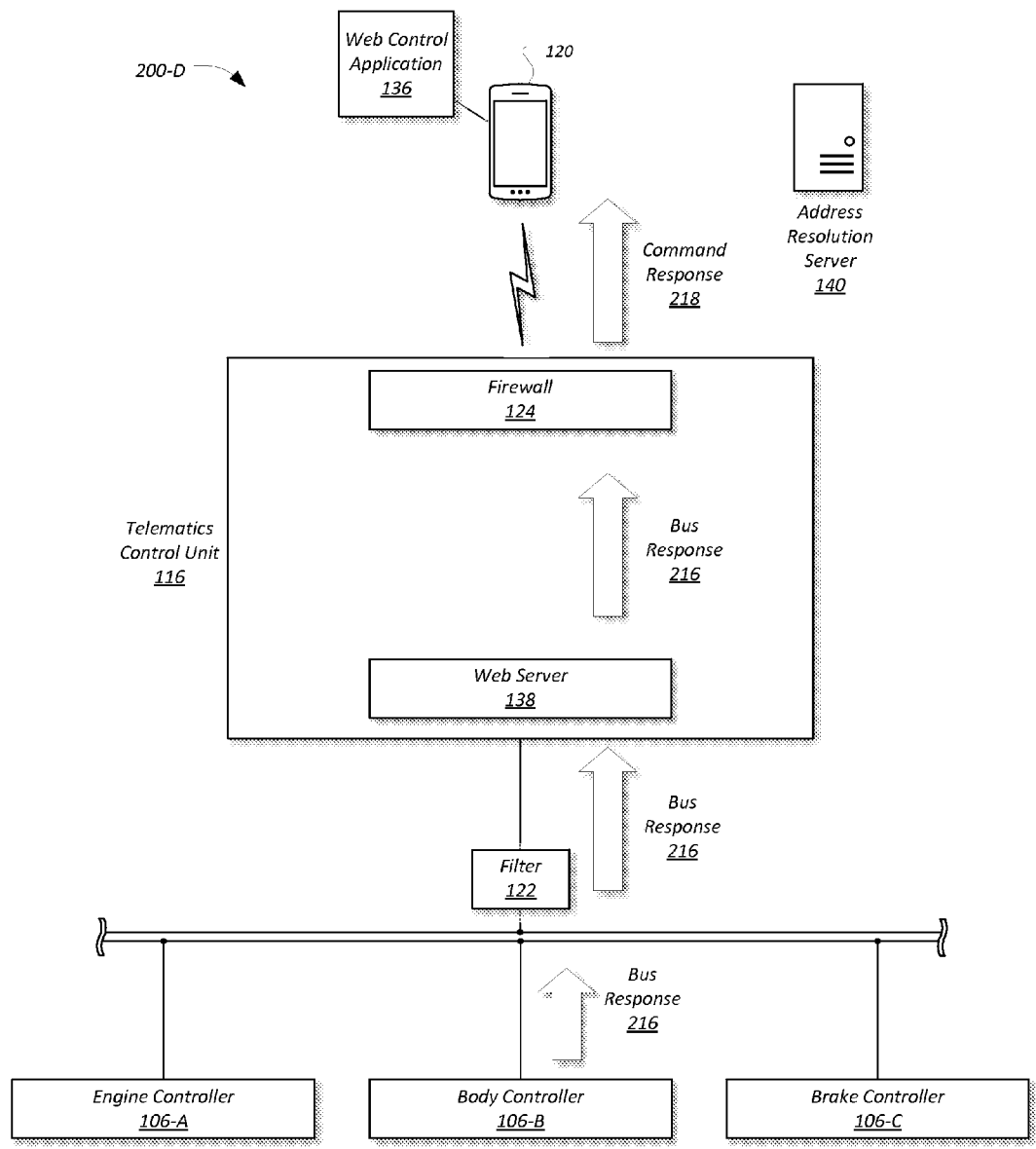
FIG. 2D illustrates an example data flow for receiving a telematics command response from the vehicle to the mobile device.

FIG. 2D illustrates an example data flow 200-D for receiving a telematics command response from the vehicle 102 to the mobile device 120. The data flow 200-D may be initiated, in an example, responsive to the controller 106 receiving the bus command 214. As shown, the controller 106 may send a bus response 216 directed to the telematics control unit 116 responsive to the bus command 214. The bus response 216 may include information regarding whether the bus command 214 succeeded or failed. Continuing with the lock example, the bus response 216 may indicate whether the vehicle 102 doors were successfully locked or unlocked. The telematics control unit 116 may receive the bus response 216 from the controller 106, which may be processed by the web server 138 to generate a command response 218. The command response 218 may be sent over the communication network 114 to the mobile device 120 to inform the web control application 136 of the status of the command request 212.

Thus, the web control application 136 of the mobile device 120 and the web server 138 of the telematics control unit 116 may be used to allow a user to remotely send commands to the vehicle 102. In some cases, however, the web server 138 of the vehicle 102 may be inactive or otherwise unable to receive commands from the web control application 136 until it is started or re-activated.

Figure 3A:
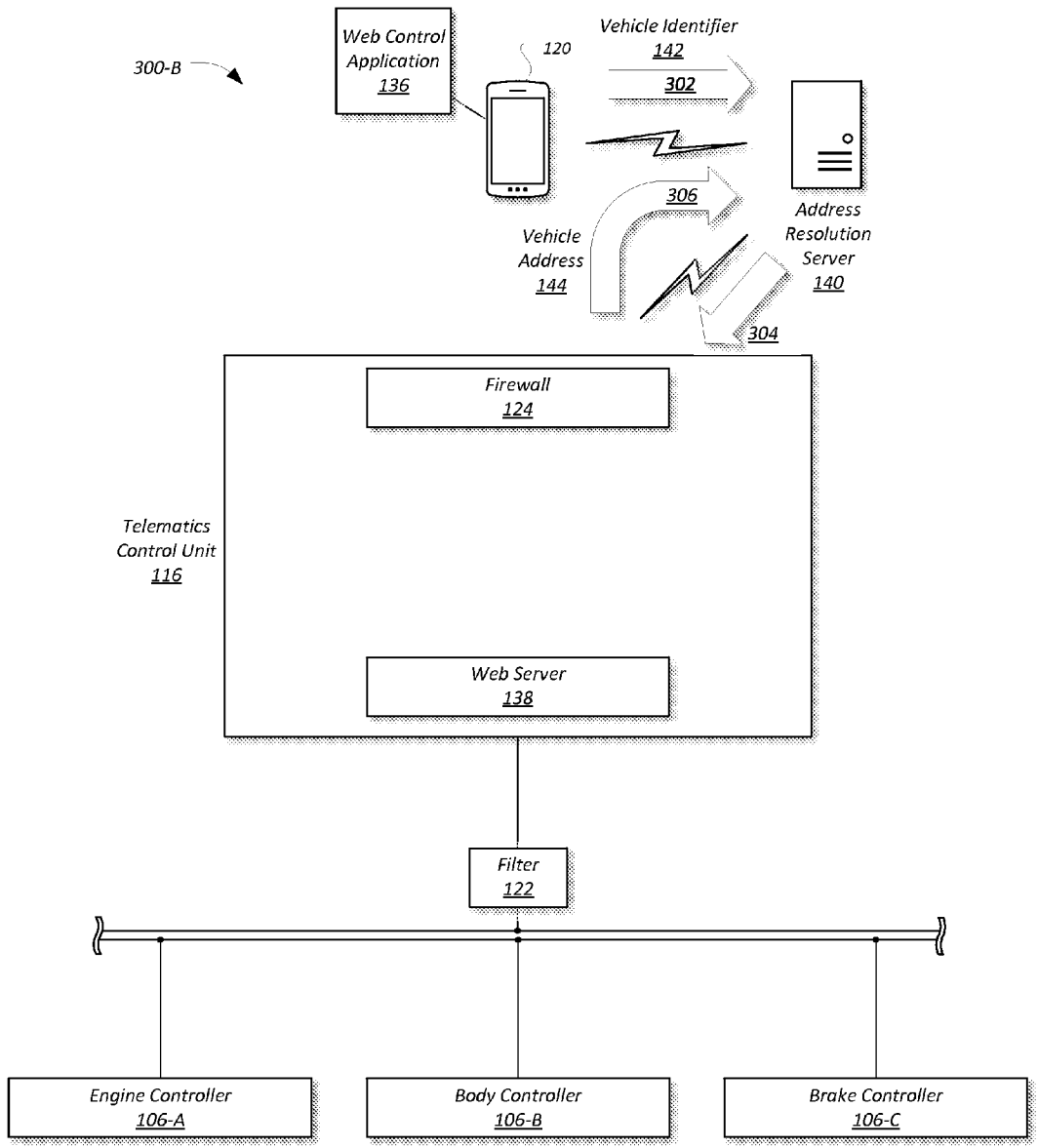
FIG. 3A illustrates an example data flow for requesting a wake-up message to be sent to the vehicle.

FIG. 3A illustrates an example data flow 300-A for requesting a wake-up message 304 to be sent to the vehicle 102. The data flow 300-A may be initiated, in an example, responsive to the web control application 136 requesting the vehicle address 144 from the address resolution server 140. The address resolution server 140 may identify that a vehicle address 144 is not available for the vehicle 102, such as due to the vehicle 102 providing a message to the address resolution server 140 indicating that the web server 138 is or will be shut down, a predetermined period of time having passed since the address resolution server 140 has received the vehicle address 144 from the vehicle 102, or the address resolution server 140 attempting to ping or otherwise message the vehicle address 144 of the vehicle 102 and not receiving a reply within a predetermined period of time.

The address resolution server 140 may send a wake-up message 304 to the telematics control unit 116 of the vehicle 102. In an example, rather than sending a message to a vehicle address 144 (e.g., an IP address), the address resolution server 140 may send the wake-up message 304 over SMS or another protocol with which the vehicle 102 may be accessed via a static address other than the vehicle address 144 used for communication over the communication network 114 by the web server 138.

In response to receiving the wake-up message 304, the telematics control unit 116 may direct the web server 138 to restart or re-activate. Restarting the web server 138 may include the web server 138 establishing a connection to the communication network 114 using the wireless transceiver 118, and providing the vehicle address 144 of the established connected to the address resolution server 140 in a wake-up response message 306.

Responsive to receiving the wake-up response message 306, the address resolution server 140 may send the vehicle address 144 to the mobile device 120. In an example, the address resolution server 140 may send the response message 204 including the located vehicle address 144 to the mobile device 120. In another example, the address resolution server 140 may send a message to the mobile device 120 indicating that the message 202 may be resent.

Figure 3B:
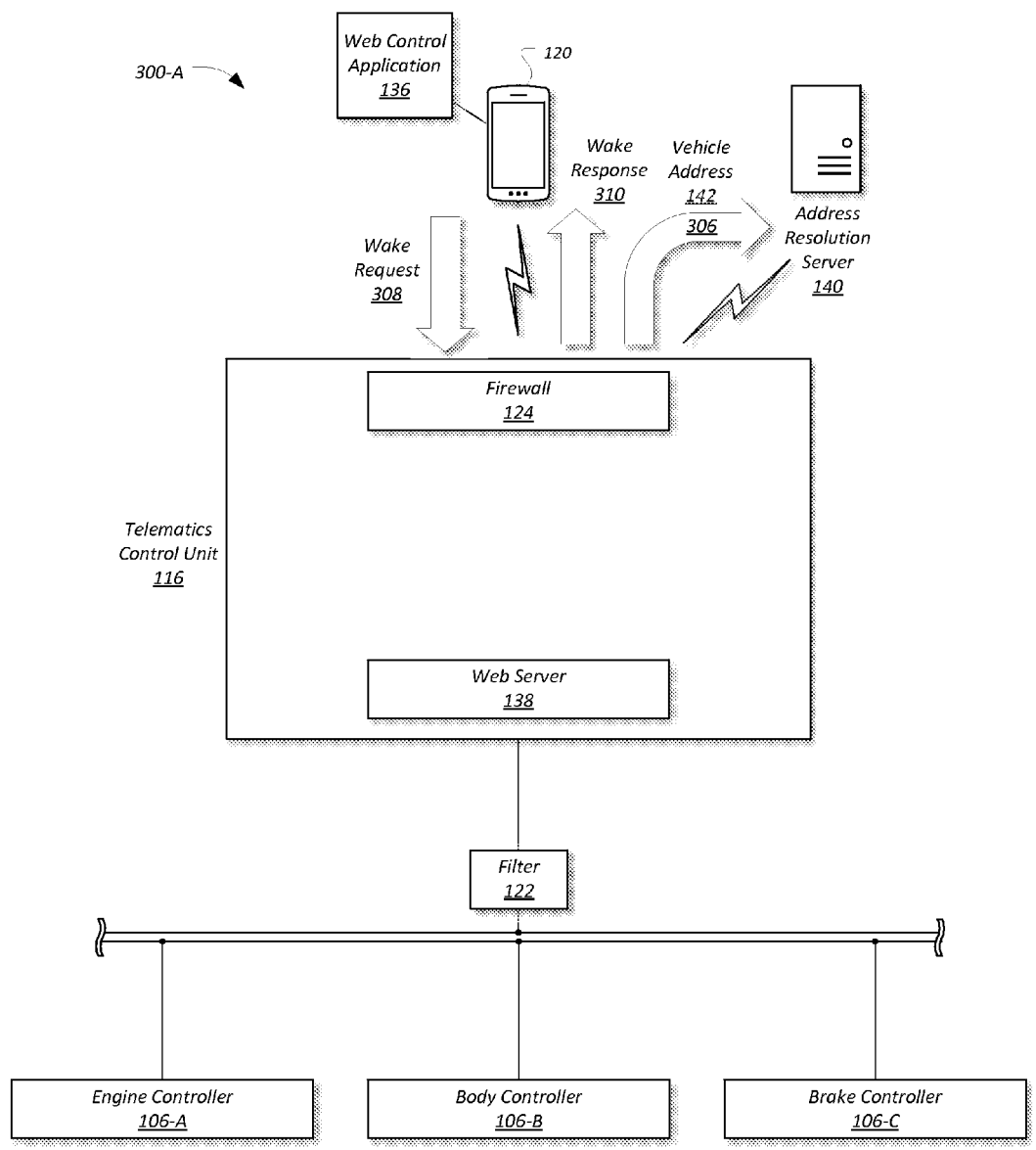
FIG. 3B illustrates an example data flow for requesting a wake-up message to be sent to the vehicle.

FIG. 3B illustrates an alternate example data flow 300-B for requesting a wake-up message 304 to be sent to the vehicle 102. The data flow 300-A may be initiated, in an example, responsive to the web control application 136 requesting the vehicle address 144 from the address resolution server 140. As compared to the data flow 300-A, in the data flow 300-B the mobile device 120 may request for the web server 138 to restart or re-activate. For instance, if the web control application 136 receives a vehicle address 144 from the address resolution server 140 that is an invalid address (e.g., is a predetermined invalid address value such as zero, is an address that does not resolve or that times out after a predetermined timeout), the web control application 136 may direct the mobile device 120 to send the wake-up message 304 to the telematics control unit 116. The vehicle 102 may accordingly send the wake-up response message 306 to the address resolution server 140. The vehicle 102 may also send a wake-up complete message 310 to the mobile device 120, to inform the web control application 136 of the vehicle address 144 or to request the vehicle address 144 from the address resolution server 140.

Figure 4A:
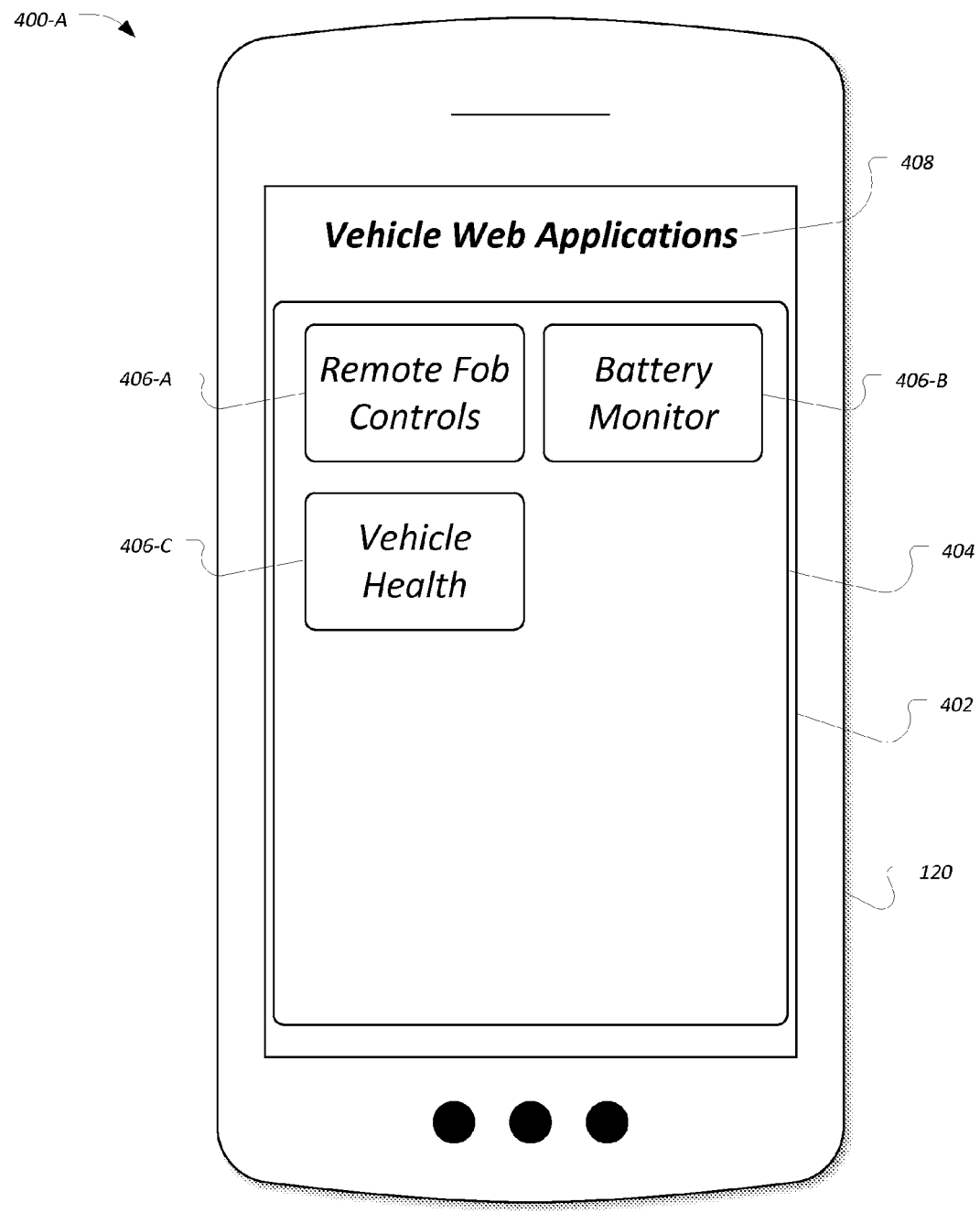
FIG. 4A illustrates an example user interface of the access portal to the web server of the vehicle.

FIG. 4A illustrates an example user interface 400-A of the access portal to the web server 138 of the vehicle 102. The user interface 400-A may be displayed on a screen or other display 402 of the mobile device 120, and may include an application listing 404 of one or more applications installed to and available on the web server 138. The application listing 404 may be retrieved by the web control application 136 from the web server 138 once the mobile device 120 is authorized to use the web server 138. As some non-limiting examples, the application listing 404 may include a fob controls application 406-A providing lock and unlock telematics functionality, a battery monitor application 406-B providing battery state of charge telematics functionality, and a vehicle health application 406-C providing vehicle 102 diagnostics telematics functionality. It should be noted that these are only examples, and more, fewer, and different applications 406 may be available. The user interface 400-A may also include a title 408 (e.g., a title of content provided by the web server 138) indicating to the user that the application listing 404 is of vehicle web applications available for use by the user.

A user of the user interface 400-A may touch or otherwise select from the application listing 404 to invoke the corresponding web applications. In an example, the elements of the application listing 404 may be implemented as hypertext markup language (HTML) controls (e.g., buttons, a list, etc.) that, when selected, submit information to the web server 138 indicative of which function was requested. In another example, the elements of the application listing 404 may include Java controls, UIKit controls, or another form of user interface that may be hosted by the web server 138 and provided to the mobile device 120 to be rendered by the web control application 136 of a mobile device 120 to the display 402 for access by the user.

Figure 4B:
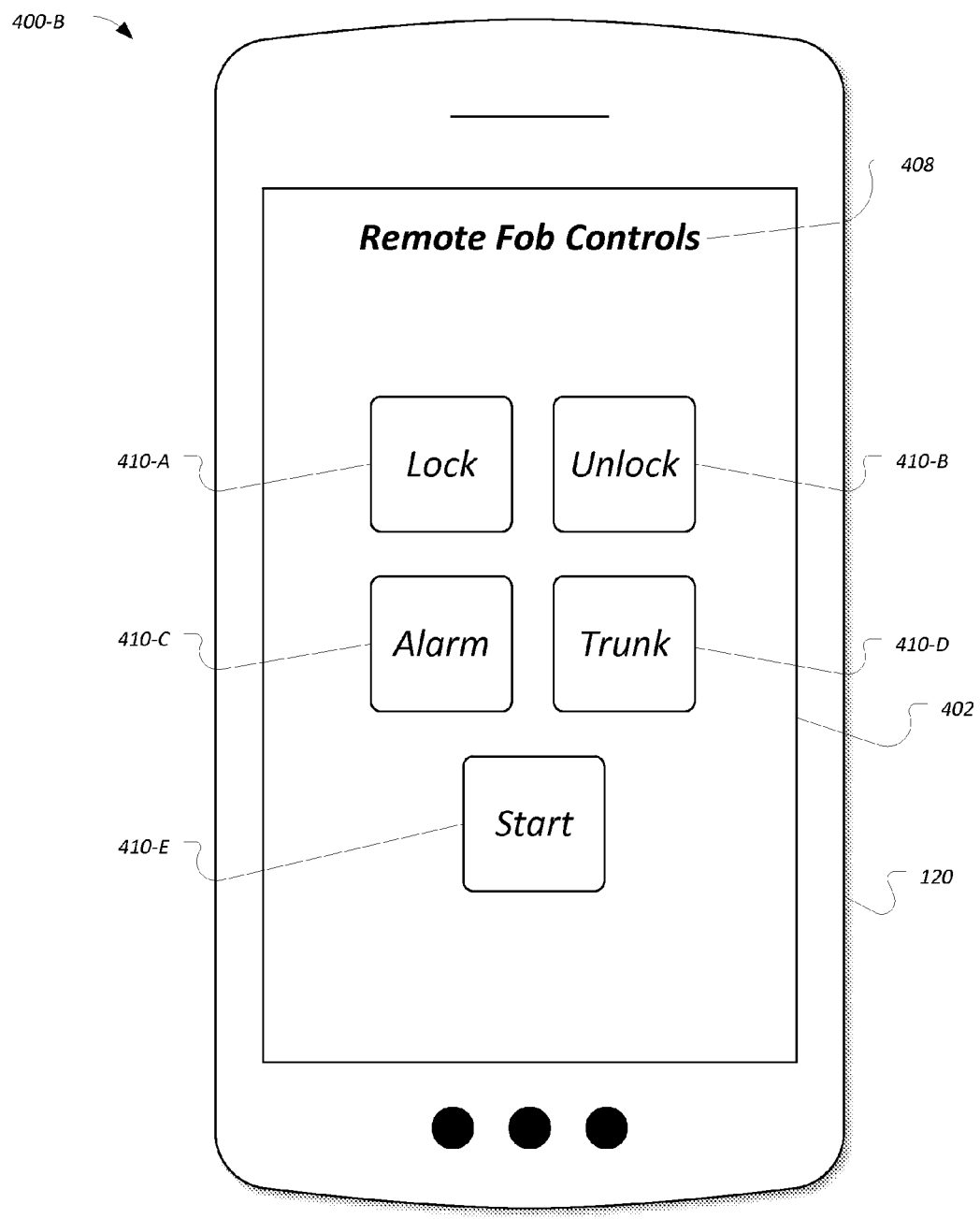
FIG. 4B illustrates an example user interface of an application of the access portal to the web server of the vehicle.

FIG. 4B illustrates an example user interface 400-B of an application of the access portal to the web server of the vehicle. In an example, the user interface 400-B may be displayed on the display 402 of the mobile device 120 responsive to use selection of one of the applications listed in the application listing 404 of the access portal. As shown, the user interface 400-B displays telematics functions of the fob controls application 406-A, e.g., responsive to user selection of fob controls application 406-A from the application listing 404.

The example fob controls application 406-A includes a set of controls 410 that may be used to invoke key fob-style telematics functions of the vehicle 102. These controls may include a lock control 410-A that, when selected, requests that the vehicle 102 doors be locked, an unlock control 410-B that, when selected, requests that the vehicle 102 doors be unlocked, an alarm control 410-C that, when selected, requests that the vehicle 102 alarm be invoked, an trunk release control 410-D that, when selected, requests that the vehicle 102 truck be unlatched, and a start control 410-E that, when selected, requests that the vehicle 102 engine be started. Similar to as discussed above, the controls 410 may be HTML controls provided in web content from the web server 138 that, when selected, cause the web control application 136 of a mobile device 120 to submit information to the web server 138 indicative of which function was requested. Additionally or alternately, the controls 410 may include Java controls, UIKit controls, or another form of user interface that may be rendered by the web control application 136 of a mobile device 120 to the display 402 for access by the user. The user requests to perform the telematics functions may be received by the web server 138, and processed such as described above with respect to FIGS. 2C and 2D.

Figures 5, 6:
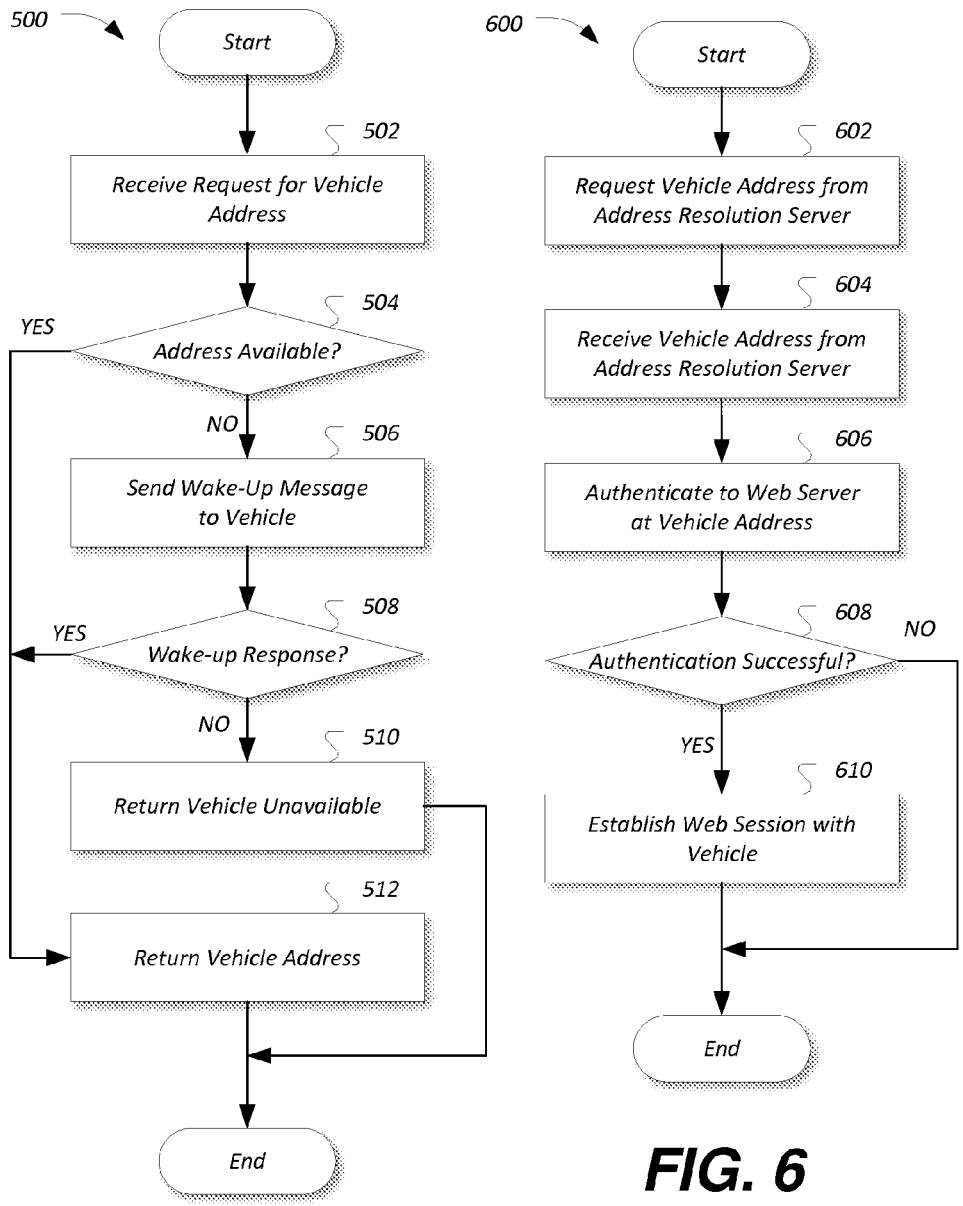
FIG. 5 illustrates an example process for determining a vehicle address for a web server of a vehicle.
FIG. 6 illustrates an example process for establishing a web session with a vehicle address of a web server of a vehicle.

FIG. 5 illustrates an example process 500 for determining a vehicle address 144 for a web server 138 of a vehicle 102. In an example, the process 500 may be performed by the address resolution server 140.

As illustrated at operation 502, the address resolution server 140 receives a request message 202 for a vehicle address 144. The message 202 may include the vehicle identifier 142 of the vehicle 102 to be accessed. In an example, the address resolution server 140 may receive the message 202 over the communication network 114 from the web control application 136 of the mobile device 120.

At decision operation 504, the address resolution server 140 determines whether the vehicle address 144 is available. In an example, the address resolution server 140 may maintain vehicle identifier 142 and associated vehicle addresses 144 in a database or other data store, and may query the data store to determine whether an associated vehicle address 144 is stored. If so, control passes to operation 512 to send a response message 204 including the located vehicle address 144 responsive to the request. Otherwise, control passes to operation 506.

The operations as represented by operation 506 include sending a wake-up message 304 to the vehicle 102. In an example, the address resolution server 140 may maintain, in the data store, phone numbers or other contact information for the wireless transceiver 118 associated with the vehicle identifier 142, and may query the data store for the associated contact information. The address resolution server 140 may further send the wake-up message 304 to the vehicle 102. As one possibility, the address resolution server 140 may send the wake-up message 304 to the phone number of the wireless transceiver 118 of the vehicle 102 via SMS.

In decision operation 508, the address resolution server 140 determines whether a wake-up response message 306 was received from the vehicle 102. In an example, the address resolution server 140 may wait for a predetermined timeout period of time to receive a wake-up response message 306 from the wireless transceiver 118. As one possibility, the address resolution server 140 may receive the wake-up response message 306 from the in-vehicle wireless transceiver 118 via SMS. If a wake-up response message 306 is received, control passes to operation 512. Otherwise, control passes to operation 510.

At 510, the address resolution server 140 responds to the request message 202 with a response message 204 indicating that the web server 138 of the vehicle 102 is not available. On the other hand, at 512, the address resolution server 140 responds to the request message 202 with a response message 204 including the vehicle address 412. After operations 510 and 512, the process 500 ends.

FIG. 6 illustrates an example process 600 for establishing a web session with a vehicle address 144 of a web server 138 of a vehicle 102. In an example, the process 600 may be performed by the web control application 136 of the mobile device 120.

At operation 602, the mobile device 120 requests the vehicle address 144 of the vehicle 102 from the address resolution server 140. In an example, a user of the mobile device 120 may invoke the web control application 136 and may select to connect to the vehicle 102. Responsive to the selection, similar to as discussed above at operation 502, the web control application 136 may direct the mobile device 120 to send the request message 202 for the vehicle address 144 to the address resolution server 140. The message 202 may include the vehicle identifier 142 of the vehicle 102 to be accessed.

At 604, the mobile device 120 receives the vehicle address 144 from the address resolution server 140. In an example, the mobile device 120 may receive the wake-up response message 306, similar to as discussed above at operation 512.

At operation 606, the mobile device 120 attempts authentication with the web server 138 at the vehicle address 144. In an example, the web control application 136 may send a connection request 206 to vehicle address 144 of the web server 138. In response to receiving the connection request 206, the firewall 124 may validate the mobile device 120 (e.g., via IP address, MAC address, paired device data, etc.) to ensure that the mobile device has permission to access the web server 138. After the firewall validation, the mobile device 120 may receive an authentication request 208 from the web server 138. The authentication request 208 may request credentials of the user of the mobile device 120 and/or credentials of the mobile device 120 itself. In an example, the authentication request 208 may request a certificate from the mobile device 120. The mobile device 120 may send an authentication response 210 to the web server 138 in response to the authentication request 208. Continuing with the certificate example, the web control application 136 may direct the mobile device 120 to include the requested certificate in the authentication response 210. The web server 138 may accordingly validate the mobile device 120 using the received credentials (e.g., by comparing to stored credentials, verifying a received signature using a cryptographic key, etc.).

In operations as represented by 608, the mobile device 120 determines whether authentication was successful. In an example, the mobile device 120 may receive a message from the web server 138 indicating whether the web server 138 grants access to the mobile device 120. In another example, the mobile device 120 may infer that access is granted if the web server 138 continues to communicate with mobile device 120. If authentication was successful, control passes to operation 610 where the mobile device 120 establishes a web session with the web server 138 at the vehicle address 144. Otherwise the process 600 ends. After the web session at operation 610 concludes, the process 600 ends.

FIG. 7 illustrates an example process 700 for displaying an access portal of the web server 138 of the vehicle 102 by the mobile device 120. In an example, the process 700 may be performed by the web control application 136 of the mobile device 120.

At 702, the mobile device 120 receives the listing of web applications. In an example, the mobile device 120 may request the available applications over the web session with the web server 138 established at operation 608. At operation 704, the mobile device 120 displays the access portal including the listing of web applications. An example access portal displayed by the web control application 136 illustrating the application listing 404 is described above with respect to FIG. 4A.

At operation 706, the mobile device 120 receives user interface command input. In an example, a user may select one of the applications listed in the application listing 404 of the access portal, and may further select a telematics command from the selected application. An example user interface of an application is described above with respect to FIG. 4B.

In operations as represented by 708, the mobile device 120 sends the command request 212 to the vehicle 102. In an example, the command request 212 may be a command to lock or unlock doors from a key fob application. In another example, the command request 212 may be a request for battery state of charge from a battery status application. The vehicle 102 may accordingly receive and process the command request 212 sent by the web control application 136. At operation 710, the mobile device 120 receives a command response 218 from the vehicle 102. In an example, the command response 218 may indicate whether the vehicle 102 doors were successfully locked or unlocked. In another example, the command response 218 may indicate the current battery state of charge. At 712, the mobile device 120 updates the user interface. As some examples, the web control application 136 may update the user interface to indicate the current vehicle 102 lock status or state of charge. After operation 712, the process 700 ends.

FIG. 8 illustrates an example process 800 for adding web applications to the web server 138. In an example, the process 800 may be performed by the web control application 136 of the mobile device 120 in communication with the web server 138 of the vehicle 102.

At operation 802, the web server 138 identifies new or updated web applications. In an example, the web server 138 may periodically query an application store for updates for currently-installed web applications. For instance, the web server 138 may provide identifiers of currently-installed web applications and currently version levels to the application store server, and may receive indications of which web applications have updates that are available. In another example, the user may identify one or more new applications to be installed to the web server 138. As one possibility, the user may browse the application store server using the mobile device 120, and may select one or more web applications to be installed to the web server 138. For instance, the requests to install the web applications may be sent as command requests 212 to the web server 138 when the mobile device 120 is connected to the web server 138 in a web session.

At 804, the web server 138 installs new or updated web applications to the web server 138. For example, the web server 138 may download the new or updates web applications from the application store, and may install the applications to the web server 138. At operation 806, the web server 138 updates the listing of web applications. Thus, the new or updated web applications may become available in the access portal application listing 404. After operation 806, the process 800 ends.

In general, computing systems and/or devices, such as the controllers 106, telematics control unit 116, mobile device 120, firewall 124, and address resolution server 140 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the controllers 106, telematics control unit 116, mobile device 120, firewall 124, and address resolution server 140 generally include computer-executable instructions that may be executable by one or more processors of the computing devices. Computer-executable instructions, such as those of the web control application 136, may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the data stored by the address resolution server 140, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controllers 106, telematics control unit 116, mobile device 120, firewall 124, and address resolution server 140 may be such computer program products (e.g., the web control application 136). In some example, these computer program products may be provided as software that when executed by one or more processors provides the operations described herein. Alternatively, the computer program products may be provided as hardware or firmware, or combinations of software, hardware and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    receiving a request, including a vehicle identifier, for a network address of a web server of a vehicle;
    accessing a database to retrieve a telephone number of the vehicle associated with the vehicle identifier;
    sending a wake-up message, to the telephone number, requesting wake-up of the web server;
    receiving a wake-up response from the vehicle including the network address of the web server; and
    returning the network address responsive to the request.

2. The method of claim 1, further comprising sending the wake-up message to an in-vehicle modem over short message service (SMS).

3. The method of claim 2, further comprising receiving the wake-up response from the in-vehicle modem over short message service (SMS).

4. The method of claim 1, wherein the network addresses include one or more Internet Protocol version 6 (IPv6) address or Internet Protocol version 4 (IPv4) address.

5. The method of claim 1, further comprising:
    storing the network address of the web server in the database in association with the vehicle identifier;

receiving a second request, including the vehicle identifier, for the network address of the web server of the vehicle;
retrieving the network address from the database using the vehicle identifier; and
returning the network address responsive to the second request.

\* \* \* \* \*